United States Patent
Hutz et al.

(10) Patent No.: US 11,553,320 B1
(45) Date of Patent: Jan. 10, 2023

(54) DETECTION AND HANDLING OF HOME OWNER MOVING BY A HOME MONITORING SYSTEM

(71) Applicant: Alarm.com Incorporated, Tysons, VA (US)

(72) Inventors: David James Hutz, Herndon, VA (US); Thomas Rogers, Tysons, VA (US)

(73) Assignee: Alarm.com Incorporated, Tysons, VA (US)

( * ) Notice: Subject to any disclaimer, the term of this patent is extended or adjusted under 35 U.S.C. 154(b) by 1100 days.

(21) Appl. No.: 15/478,490

(22) Filed: Apr. 4, 2017

Related U.S. Application Data

(60) Provisional application No. 62/318,378, filed on Apr. 5, 2016.

(51) Int. Cl.
*H04W 4/80* (2018.01)
*G06Q 50/16* (2012.01)
(Continued)

(52) U.S. Cl.
CPC .............. *H04W 4/80* (2018.02); *G06Q 50/16* (2013.01); *G08B 17/00* (2013.01);
(Continued)

(58) Field of Classification Search
CPC .. G06Q 50/16; G06Q 30/0645; G06Q 50/163; G06Q 50/167; G08B 17/00;
(Continued)

(56) References Cited

U.S. PATENT DOCUMENTS 5,990,885 A * 11/1999 Gopinath ......... H04N 21/44222
348/E7.071
7,467,092 B2 * 12/2008 Anderson .............. G06Q 50/06
705/314
(Continued)

FOREIGN PATENT DOCUMENTS

GB        2524270 A   *  9/2015   ............. G06N 7/005
JP        3887534 B2  *  2/2007
(Continued)

OTHER PUBLICATIONS

Kleiminger, Wilhelm, et al. "Occupancy detection from electricity consumption data." Proceedings of the 5th ACM Workshop on Embedded Systems For Energy-Efficient Buildings. 2013. (Year: 2013).*

(Continued)

*Primary Examiner* — Mehmet Yesildag
*Assistant Examiner* — Thomas Yih Ho
(74) *Attorney, Agent, or Firm* — Fish & Richardson P.C.

(57) ABSTRACT

Techniques are described for determining that a property is vacant based on monitoring data collected by connected sensors and appliances near or within the property. In response to determining that a property is vacant, the condition of the vacant property can be monitored for various risks such as fire safety and security breaches. Monitoring techniques may also be used to determine when a new customer (e.g., a new tenant or property owner) has moved into the property. In response to detecting a move-in, one or more notifications may be transmitted to assist the new customer to customize a security system associated with the property. In this regard, techniques described herein may be used by service providers to improve the transition associated with move-in and move-out processes, which may also improve retention of monitoring services.

20 Claims, 11 Drawing Sheets

(51) Int. Cl.
  *G08B 17/00* (2006.01)
  *H04L 12/28* (2006.01)
  *H04L 67/50* (2022.01)
  *G08B 19/00* (2006.01)
  *H04L 67/12* (2022.01)
  *H04W 84/18* (2009.01)

(52) U.S. Cl.
  CPC ........ *H04L 12/2803* (2013.01); *H04L 67/535* (2022.05); *G08B 19/005* (2013.01); *H04L 67/12* (2013.01); *H04W 84/18* (2013.01)

(58) Field of Classification Search
  CPC ... G08B 19/005; H04L 12/2803; H04L 67/22; H04L 67/12; H04W 84/18; H04W 4/80
  See application file for complete search history.

(56) References Cited

U.S. PATENT DOCUMENTS

| | | | | |
|---|---|---|---|---|
| 9,977,547 | B1* | 5/2018 | Sloo | G06F 3/044 |
| 10,009,716 | B1* | 6/2018 | Niles | H04L 67/141 |
| 2003/0149576 | A1* | 8/2003 | Sunyich | G06Q 10/02 |
| | | | | 705/5 |
| 2005/0216302 | A1* | 9/2005 | Raji | H04L 41/0853 |
| | | | | 705/314 |
| 2007/0176739 | A1* | 8/2007 | Raheman | G07C 9/00904 |
| | | | | 340/5.64 |
| 2009/0189764 | A1* | 7/2009 | Keller | G08B 13/126 |
| | | | | 340/552 |
| 2009/0198600 | A1* | 8/2009 | Anderson | G06Q 30/04 |
| | | | | 705/34 |
| 2011/0071951 | A1* | 3/2011 | John | G06Q 99/00 |
| | | | | 705/307 |
| 2011/0181412 | A1* | 7/2011 | Alexander | G05B 19/042 |
| | | | | 340/541 |
| 2011/0251725 | A1* | 10/2011 | Chan | H05B 47/105 |
| | | | | 700/277 |
| 2011/0290893 | A1* | 12/2011 | Steinberg | F24F 11/30 |
| | | | | 236/49.3 |
| 2012/0066168 | A1* | 3/2012 | Fadell | G06N 5/04 |
| | | | | 702/140 |
| 2012/0131504 | A1* | 5/2012 | Fadell | F24D 19/1084 |
| | | | | 715/810 |
| 2013/0297075 | A1* | 11/2013 | Land, III | G05B 15/02 |
| | | | | 700/275 |
| 2014/0306833 | A1* | 10/2014 | Ricci | G06F 21/00 |
| | | | | 340/901 |
| 2014/0379305 | A1* | 12/2014 | Kumar | H05B 47/13 |
| | | | | 702/190 |
| 2015/0159895 | A1* | 6/2015 | Quam | F24F 11/62 |
| | | | | 700/275 |
| 2015/0221051 | A1* | 8/2015 | Settino | G06Q 10/20 |
| | | | | 705/305 |
| 2015/0276238 | A1* | 10/2015 | Matsuoka | F24F 11/00 |
| | | | | 700/278 |
| 2015/0348187 | A1* | 12/2015 | McCarl | G06Q 40/025 |
| | | | | 705/38 |
| 2016/0077532 | A1* | 3/2016 | Lagerstedt | H04W 4/02 |
| | | | | 700/277 |
| 2016/0098806 | A1* | 4/2016 | Chen | G06Q 50/16 |
| | | | | 705/313 |
| 2016/0125318 | A1* | 5/2016 | Scoffier | H04N 7/183 |
| | | | | 706/11 |
| 2016/0125714 | A1* | 5/2016 | Kates | G08B 13/19676 |
| | | | | 386/228 |
| 2016/0162985 | A1* | 6/2016 | Alhakim | H04M 1/72412 |
| | | | | 705/307 |
| 2016/0163138 | A1* | 6/2016 | Turner | H04W 4/021 |
| | | | | 340/5.7 |
| 2016/0189513 | A1* | 6/2016 | Sloo | G08B 25/005 |
| | | | | 340/522 |
| 2016/0202851 | A1* | 7/2016 | Turner | H04W 4/029 |
| | | | | 715/734 |
| 2016/0261932 | A1* | 9/2016 | Fadell | H04Q 9/00 |
| 2016/0292740 | A1* | 10/2016 | Akhavan-Saraf | H04W 4/80 |
| 2016/0292995 | A1* | 10/2016 | Warren | H04L 12/6418 |
| 2016/0314413 | A1* | 10/2016 | Browne | G07C 9/20 |
| 2016/0363452 | A1* | 12/2016 | Mehlman | H04W 4/80 |
| 2016/0370775 | A1* | 12/2016 | Daugherty | G05B 15/02 |
| 2017/0097621 | A1* | 4/2017 | Ackmann | G05B 19/0426 |
| 2017/0177013 | A1* | 6/2017 | Malhotra | G05D 23/1393 |
| 2018/0034657 | A1* | 2/2018 | Brown | G06Q 10/0633 |
| 2018/0191720 | A1* | 7/2018 | Dawes | G06Q 30/0601 |
| 2018/0239311 | A1* | 8/2018 | Haslett | G05B 13/028 |

FOREIGN PATENT DOCUMENTS

| | | | | |
|---|---|---|---|---|
| JP | 2008299827 | A | * 12/2008 | |
| JP | 2017054257 | A | * 3/2017 | ............. G06N 7/005 |
| WO | WO-2014176379 | A2 | * 10/2014 | ............. G01K 1/14 |
| WO | WO-2015200342 | A1 | * 12/2015 | ............. H04L 67/12 |

OTHER PUBLICATIONS

Eric C., Fred Heller, and Bogdan Cirlig. "Website or service that allows landlords to poston MLS for rentals." BiggerPockets, Jan. 9, 2015, https://www.biggerpockets.com/forums/52/topics/166919-website-or-service-that-allows-landlords-to-post-on-mls-for-rentals. Accessed Mar. 11, 2022. (Year: 2022).*

* cited by examiner

300

```
┌─────────────────────────────────────────────────────────────────┐
│ RECEIVE DATA INDICATING A CUSTOMER MOVE-OUT ASSOCIATED WITH A   │
│                           PROPERTY                              │
│                                                             310 │
└─────────────────────────────────────────────────────────────────┘
                                  │
                                  ▼
┌─────────────────────────────────────────────────────────────────┐
│ MONITOR DATA GENERATED BY ONE OR MORE SENSORS LOCATED AT THE    │
│                           PROPERTY                              │
│                                                             320 │
└─────────────────────────────────────────────────────────────────┘
                                  │
                                  ▼
┌─────────────────────────────────────────────────────────────────┐
│ AUTOMATICALLY DETERMINE THAT THE PROPERTY IS PRESENTLY VACANT   │
│              BASED ON THE MONITORED DATA                        │
│                                                             330 │
└─────────────────────────────────────────────────────────────────┘
                                  │
                                  ▼
┌─────────────────────────────────────────────────────────────────┐
│ IN RESPONSE, PERFORM ONE OR MORE MOVE-IN OPERATIONS             │
│              ASSOCIATED WITH THE PROPERTY                       │
│                                                             340 │
└─────────────────────────────────────────────────────────────────┘
```

FIG. 3

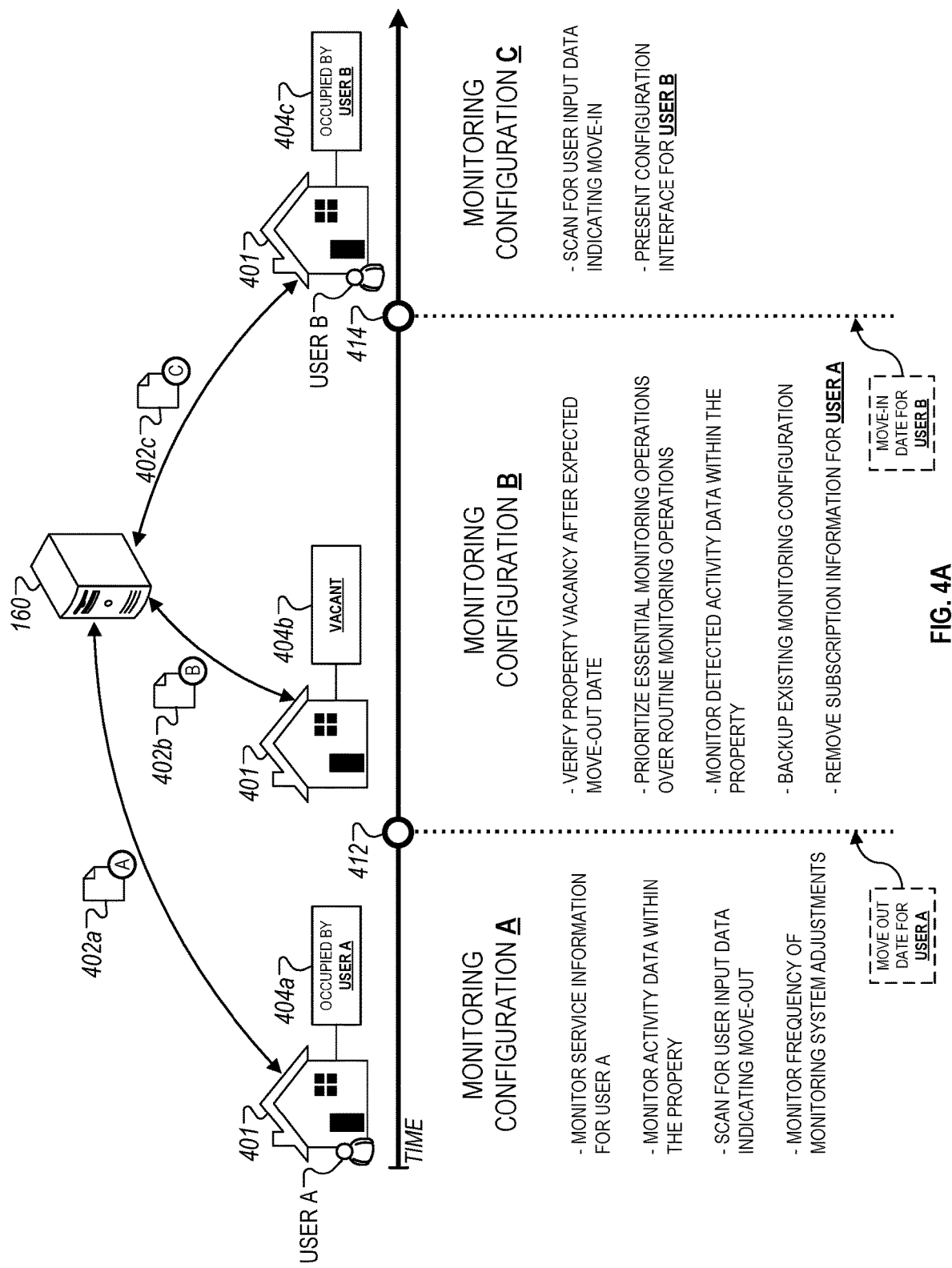

| MONITORING OPERATION | PRIORITIZATION SCORE |
|---|---|
| FIRE AND SMOKE DETECTION | 0.9 |
| MAINTAIN SET POINT TEMPERATURE | 0.3 |
| TRACK MOTION AND ACTIVITY DATA | 0.2 |
| INTRUDER AND ALARM DETECTION | 0.7 |
| ENERGY CONSUMPTION | 0.4 |

MONITORING THRESHOLD = 0.5

```
ESTABLISH AN ACCOUNT FOR A MONITORING SERVICE OF A FIRST USER
THAT OCCUPIES A FIRST PROPERTY MONITORED BY A FIRST MONITORING
SYSTEM                                                    810
           │
           ▼
MONITORING FOR CHANGES IN COLLECTED SENSOR DATA OR STATUS OF
MONITORING SERVICE INFORMATION OF THE FIRST USER
                                                          820
           │
           ▼
DETECT AT LEAST ONE CHANGE IN THE COLLECTED SENSOR DATA OR
THE STATUS OF THE MONITORING SERVICE INFORMATION OF THE FIRST
USER                                                      830
           │
           ▼
DETERMINE THAT THE FIRST USER HAS MOVED OUT OF THE FIRST
PROPERTY
                                                          840
           │
           ▼
PERFORM AN OPERATION RELATED TO CONFIGURATION OF THE FIRST
MONITORING SYSTEM
                                                          850
          ╱ ╲
         ╱   ╲
        ▼     ▼
```

| USE THE FIRST CONFIGURATION INFORMATION FOR THE FIRST MONITORING SYSTEM TO CONFIGURE THE FIRST MONITORING SYSTEM FOR A SECOND USER THAT HAS MOVED INTO THE FIRST PROPERTY  860A | USE THE FIRST CONFIGURATION INFORMATION FOR THE FIRST MONITORING SYSTEM TO CONFGURE A SECOND MONITORING SYSTEM FOR THE FIRST USER THAT MOVES INTO A SECOND PROPERTY  860B |

FIG.8

DETECTION AND HANDLING OF HOME OWNER MOVING BY A HOME MONITORING SYSTEM

CROSS-REFERENCE TO RELATED APPLICATION

This application claims the benefit of U.S. Provisional Patent Application No. 62/318,378, filed on Apr. 5, 2016 and titled "DETECTION AND HANDLING OF HOME OWNER MOVING BY A HOME MONITORING SYSTEM," which is incorporated herein by reference in its entirety.

TECHNICAL FIELD

This disclosure relates to property monitoring technology.

BACKGROUND

Monitoring service providers offer customers options to provide notifications of move-out dates. For example, a home monitoring service customer may call a monitoring service company to let them know they are moving out of their home in two months and to discontinue billing and services when the customer moves out.

SUMMARY

Techniques are described for determining that a property is vacant based on monitoring data collected by connected sensors and appliances near or within the property. In response to determining that a property is vacant, the condition of the vacant property can be monitored for various risks such as fire safety and security breaches. Monitoring techniques may also be used to determine when a new customer (e.g., a new tenant or property owner) has moved into the property. In response to detecting a move-in, one or more notifications may be transmitted to assist the new customer to customize a security system associated with the property. In this regard, techniques described herein may be used by service providers to improve the transition associated with move-in and move-out processes, which may also improve retention of monitoring services.

The details of one or more implementations are set forth in the accompanying drawings and the description below. Other features will be apparent from the description and drawings.

DESCRIPTION OF DRAWINGS

FIG. 3 is a flowchart that illustrates an example of a process for performing moving operations for a vacant property.

FIG. 4A is a diagram illustrating examples of different configurations in relation to a move-out process FIG. 5 is a diagram illustrating examples of different monitoring operations that can be prioritized when a property is determined to be vacant

FIG. 8 is a flowchart illustrating an example of a process for adjusting a configuration of a monitoring system in relation to a moving operation.

DETAILED DESCRIPTION

In some implementations, data collected by sensors and/or appliances near or within a property may be used to determine when a property has become vacant after a recent customer move-out. For instance, data indicating a customer move-out associated with a property may be received. Data generated by one or more sensors located at the property can then be monitored. The monitored data can be used to determine that the property is presently vacant. In response to determining that the property is presently vacant, one or more moving operations associated with the property may be performed. A move-in may also be detected based on sensor information and in response, moving operations may also be performed by a monitoring system.

Figure 1:
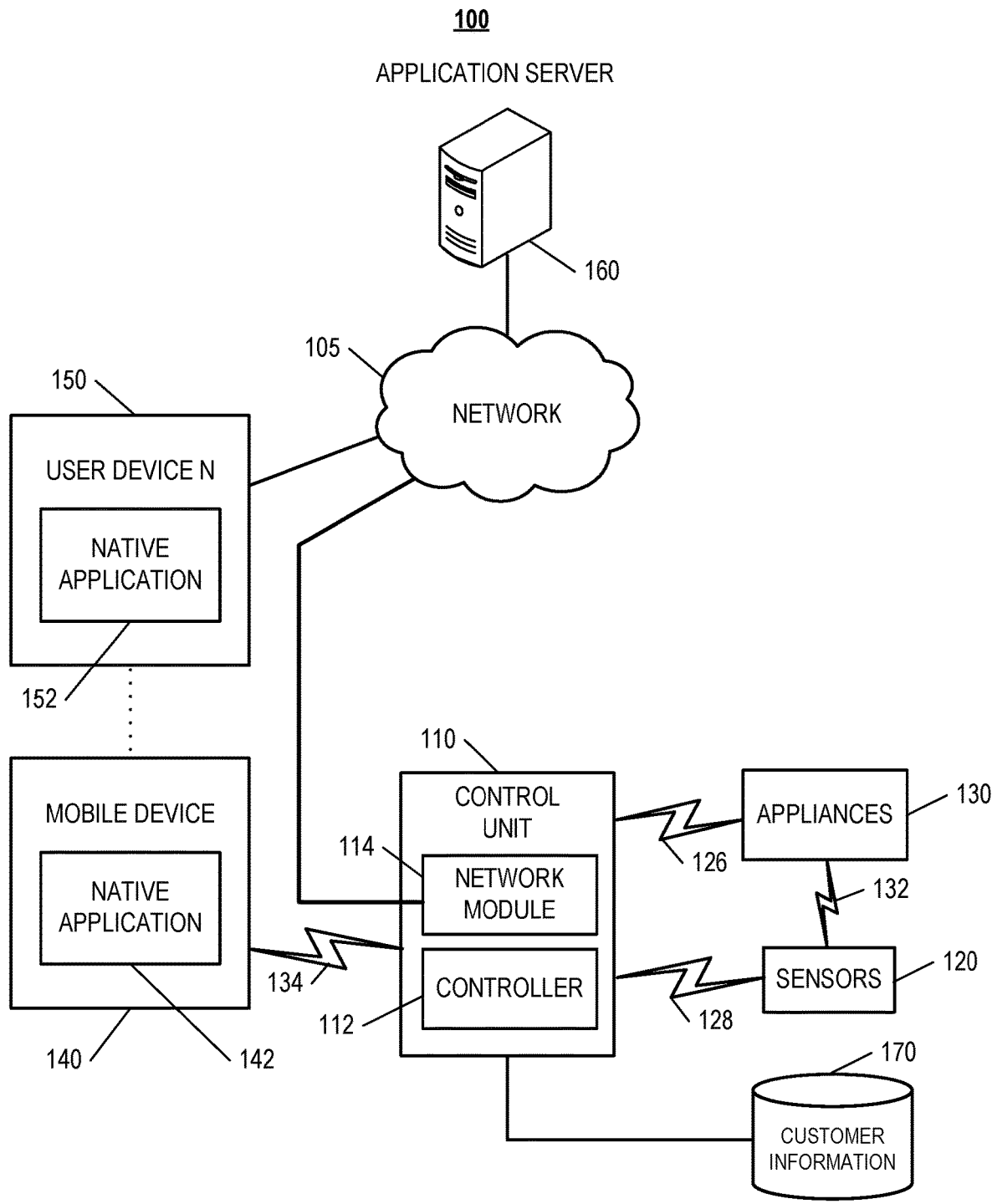
FIG. 1 is a block diagram illustrating an example of a home monitoring system.

FIG. 1 illustrates an example of a system 100 that may be configured to monitor activities near or within a property. The system 100 may include a network 105, a monitor control unit 110, sensors 120, appliances 130, client devices 140, 150, and an application server 160. The monitor control unit 110 may further store customer information 170.

The network 105 may be configured to enable electronic communications between devices connected to the network 105. For example, the network 105 may be configured to enable exchange of electronic communications between the monitor control unit 110, sensors 120, the appliances 130, client devices 140, 150, and the monitoring application server 160. The network 105 may include Local Area Networks (LANs), Wi-Fi, or analog or digital wired and wireless networks. The network 105 may include multiple networks or subnetworks, each of which may include, for example, a wired or wireless data pathway. The network 105 may also include a circuit-switched network, a packet-switched data network, or any other network able to carry electronic communications (e.g., data or voice communications). For example, the network 105 may include networks based on the Internet protocol (IP), or other comparable technologies. In some examples, the network 105 may include wide area networks (WAN) of computers that receive services provided by a service provider.

The monitor control unit 110 may include a controller 112 and a network module 114. The controller 112 may be configured to control a monitoring system, such as a security system associated with a property that includes the monitor control unit 110. In some examples, the controller 112 may include a processor or other control circuitry configured to execute instructions of a program that controls operation of a security system. In these examples, the controller 112 may be configured to receive input from sensors, detectors, or other devices associated with the security system and control operation of components of the security system, such as a camera, a motion sensor, an alarm detector, an appliance, lights, etc. For example, the controller 112 may be configured to control operation of the network module 114 included in the monitor control unit 110.

The network module 114 may be a communication device configured to exchange communications over the network 105. The network module 114 may be a wireless communication module configured to exchange wireless communications over the network 105. For example, the network module 114 may be a wireless communication device configured to exchange communications over a short-range wireless network. The network module 114 also may be configured to exchange communications over the network 105 using a wireless connection. For instance, the network module 114 may enable the monitor control unit 110 to exchange communications with the monitoring application server 160 over the network 105 without the use of the network 105. The wireless communication device may include one or more GSM modules, a radio modem, a cellular transmission module, or any type of module configured to exchange communications in one of the following formats: LTE, GSM or GPRS, CDMA, EDGE or EGPRS, EV-DO or EVDO, UMTS, IP, or Wi-Fi. The wireless communication device may also include one or more long-range radio chips that are capable of connectivity to various Internet-of-Things (IoT) networks. The long-range radio chips can be configured to exchange communications over a Sigfox global network, a Low Power Wide Area Network (LPWAN), or other types of regional, national, or global networks.

The network module 114 also may be a wired communication module configured to exchange communications over the network 105 using a wired connection. For instance, the network module 114 may be a modem, a network interface card, or another type of network interface device. The network module 114 may be an Ethernet network card configured to enable the monitor control unit 110 to communicate over a local area network and/or the Internet. The network module 114 also may be a voice-band modem configured to enable the alarm panel to communicate over the telephone lines of Plain Old Telephone Systems (POTS). In some implementations, the alarm panel may be a broadband or cellular gateway where the network module 114 may enable the monitor control unit 110 to communicate over the network 105.

The monitor control unit 110 may communicate with the sensors 120, the appliances 130, the client devices 140, 150, and the monitoring application server 160 to wirelessly transmit data generated from the sensors 120, the appliances 130, and the client devices 140, 150 over the network 105. For instance, the monitor control unit 110 may monitor the activity of the sensors 120 and the appliances 130 based on exchanging communications with the sensors 120 and the appliances 130 over the network 105.

In some instances, the monitor control unit 110 may receive data activity reports from the sensors 120 that include information related to the property (e.g., occupancy data, movement data, temperature data, etc.). In addition, the monitor control unit 110 may periodically receive video and image footage from the appliances 130 that include information related to the exterior of the property (e.g., environment data, security footage data, etc.). In response to receiving data activity reports from the sensors 120 and the appliances 130, the monitor control unit 110 may transmit the received data activity reports to the monitoring application server 160 over the network 105. For example, the monitor control unit 110 may transmit a data activity report indicating the type of data collected by the devices connected over the network 105, patterns indicated by collected data, particular analytics techniques used to identify the data patterns, and/or other types of information related to the property that may enable the monitoring application server 160 make determinations related to the property.

The monitor control unit 110 stores customer information 170 associated with the customer (e.g., tenant or property owner) associated with the property. For instance, the customer information 170 can include account information for subscription-based services that are provided to the property (e.g., customer names and passwords, subscription information, emergency contact information), property-specific information that are configured and specified by the customer (e.g., access codes to unlock entrances to the property), and a set of customer preferences that are used to operate the sensors 120 and the appliances 130 (e.g., internal set point temperature within the property, heating/cooling cycles associated with a HVAC system within the property). In this regard, the customer information 170 includes customer-specific and property-specific information that are used by the monitor control unit 110 and the application server 160 to monitor and administer services within the property.

The customer information 170 can be updated to reflect updated information and/or past, present and future milestones associated with the customer of the property. For example, data included within the customer information 170 can be updated when a customer modifies services that are received within the property. In another example, the customer information 170 can track property information such as the date when a customer has created a real estate listing for the property, a closing date indicating that the customer has finalized a sale of the property, and/or a target move-out date by the customer to vacate the premises of the property.

The monitor control unit 110 may monitor updates to the customer information 170 and flag milestones that may impact the services to be provided to the property, and adjust the operations of the components of the system 100 accordingly. In one example, if the customer information 170 is modified to include a customer move-out date, the monitor control unit 110 may then generate a corresponding set of instructions to terminate operations that are associated with customer preferences, and instead prioritize operations related to detecting safety risks associated with a vacant property. In another example, the monitor control unit 110 may prioritize certain monitoring activities that can be used to indicate when the property has either become vacant, or has been recently moved into.

The sensors 120 may include one or more of a wireless or wired sensor such as, for example, a contact sensor, a motion sensor, a glass break sensor, an occupancy sensor, or any other type of activity sensor included in a monitoring system or security system. The sensors 120 also may include an environmental sensor such as a temperature sensor, a water sensor, a rain sensor, a wind sensor, a light sensor, a smoke detector, a carbon monoxide detector, an air quality sensor, etc. In some instances, the sensors 120 may include a radio-frequency identification (RFID) sensor that identifies a particular article that includes a pre-assigned RFID tag.

The appliances 130 may be home automation devices connected to the network 105 that are configured to exchange electronic communications with other devices of the system 100. The appliances 130 may include, for example, connected kitchen appliances, controllable light sources, safety and security devices, energy management devices, and/or other types of electronic devices capable of exchanging electronic communications over the network 105. In some instances, the appliances 130 may periodically transmit information and/or generated data to the monitor control unit 110 such that the monitor control unit 110 can automatically control the operation of the appliances 130 based on the exchanged communications. For example, the monitor control unit 110 may operate one or more of the appliances 130 based on a fixed schedule specified by the customer. In another example, the monitor control unit 110 may enable or disable one or more of the appliances 130 based on received sensor data from the sensors 120.

The client devices 140, 150 may be electronic devices associated with a property owner or an occupant that exchange network communications over the network 105. For example, the client devices 140, 150 may be smartphones, tablets, personal computers (PCs), network-enabled media players, home entertainment systems, cloud storage devices, smart wearable devices, and other types of network devices. The client devices 140, 150 may access a service made available by the monitoring application server 160 on the network 105, such as a mobile application. The data generated by the client devices 140, 150 may include over the network 105, which may be monitored by the monitor control unit 110.

The application server 160 is an electronic device configured to provide control services by exchanging electronic communications with the monitor control unit 110 and the one or more client devices 140, 150 over the network 105. For example, the application server 160 can be configured to monitor data obtained by the monitor control unit 110. In this example, the application server 160 can exchange electronic communications with the network module 114 included in the thermostat control unit 110 to send and/or receive information regarding activity at the property and/or the environment at the property. The application server 160 also can receive information regarding activity within or external to the property from the one or more mobile devices 140, 150. For example, the application server 160 can receive information from the one or more client devices 140, 150 that indicates the locations of the one or more mobile devices 140, 150.

In some implementations, the application server 160 can be associated with a service provider that provides subscription-based security services to the property associated with the system 100. For instance, the application server 160 may be configured to identify customer subscription based on the stored customer information 170, and then exchange data communications with the monitor control unit 110 such as alarm signal data, life-critical data, or other types of information that indicate that the property may possibly be at risk. In such implementations, the application server 160 may store corresponding account-specific information that is stored within the customer information. For instance, such information can include access codes that were preset by a property owner or tenant, customer names and passwords associated with the customer account, payment information, and/or customer preferences for specific security configurations for the property (e.g., a predetermined time to enable and disable an alarm at the property).

In other implementations, the application server 160 can be operated by a third-party service provider that maintains one or more components of the system 100. For example, in such implementations, the application server 160 can be operated by a provider that does not provide security services to the property but monitors data collected by the components of the system 100 that can be used to indicate risks associated with the property. For instance, the third party service provider can accumulate the collected data, and provide data activity reports to the designated security provider of the property. In such instances, the data collected by the system 100 and stored at the application server 160 can be used to supplement data collected by the security provider to provide security services to the property.

In some implementations, the data collected by the components of the system 100 can be used to determine when the property is vacant. For instance, occupancy data collected by the sensors 120 can be used to monitor movement and activity within the property to determine whether a property is vacant. Examples that can be used to indicate vacancy may include the lack of customer input on the appliances 130 over a threshold period of time, lack of adjustments to the internal set point temperature within the property and/or the lack of any detected activities within or near the premises of the property indicating that an occupant has not been present within the property for an extended period of time.

In some implementations, the control unit 110 may monitor for occupancy data in response to determining that a property owner is scheduled to move out. For example, in response to determining that customer information for a property owner has been updated to indicate that the property owner called the monitoring service provider to tell the provider that the property owner will move out in a month, the monitor control unit 110 may proactively transmit instructions to the sensors 120 to increase monitoring activities of the premises of the property to determine when the customer actually moves out of the property. In another example, the control unit 110 may access a multiple listing service (MLS) that indicates that the property has been sold, and in response to determining that the property is for sale or has been sold, increase monitoring activities to determine whether the customer has moved or when the customer moves out. In yet another example, the control unit 110 may increase monitoring in response to receiving information regarding an electronic request to transfer Internet or phone services for the property owner.

The control unit 110 may request confirmation from a customer that the customer has moved out. For example, in response to determining sensor data from the property indicates that the property is vacant, the control unit 110 may provide a request to a mobile device of the customer that prompts for confirmation whether the customer has moved out.

In response to determining a property is vacant, the control unit 110 may perform moving operations. For example, the control unit 110 may place the property into a vacant monitoring mode where the control unit 110 may monitor for fire, motion, and appliance activity but may not monitor for other types of events, e.g., not monitor for temperature changes. In another example, after determining that the property is presently vacant, the monitor control unit 110 may automatically transmit instructions to the sensors 120 and the appliances 130 to adjust their operations to prioritize monitoring activities directed to reducing susceptibility to risks associated with the property. In some implementations, the data collected by the components of the system 100 can be used to provide move-in information to a new customer of the property prior to, or recently after, a move-in process. For instance, after determining that the property is presently vacant, the monitor control unit 110 may clear the stored customer information 170 associated with the prior customer, and reset the operation of the components of the system 100. As an example, the monitor control unit may remove configured security access codes and/or passwords associated with the property that were previously configured by the prior customer. In some instances, the monitor control unit 110 may also implement a temporary security access code to the property to secure the vacant property after a prior customer has moved out, but before a new customer has moved in. In such instances, the temporary security access code may be provided to the new customer prior to his/her move-in date. For example, a temporary security access code may be e-mailed to an e-mail address for the new customer that is provided by the previous customer in response to a request for the previous customer to confirm they have moved out.

In some implementations, the monitor control unit 110 may be capable of using data verification techniques related to determining whether a property is actually vacant. For example, the monitor control unit 110 may use pattern recognition to determine when certain types of movement detected by the sensors 120 within the property are associated with an occupant, and other types of movement detected are associated with a realtor. In some instances, such a determination may be augmented by access to realtor data indicating open house schedules for the property. In another example, the monitor control unit 110 may use two factor authentication techniques to verify the identity of the prior customer or the new customer of the property. For example, prior customer information included in the customer information 170 may be password-protected to prevent a new customer from inadvertently or intentionally accessing private or personal information.

The monitor control unit 110 may determine that someone has moved in based on sensor activity. For example, the monitor control unit 110 may determine that sustained activity has been detected in the home during a six-hour period, in response, determine that someone has moved into the home. In response to determining that someone has moved into the home, the control unit 110 may cease all monitoring and provide a notification to the person that has moved in regarding the availability of home monitoring. For example, the control unit 110 may cause a speaker in a control panel to announce, "New Home Owner Detected. All Monitoring Services Being Shut Off. If Interested In Monitoring, Please See the Security Control Panel."

In some implementations, the operations performed by the monitor control unit 110, as described throughout, can additionally or alternatively be performed by the application server 160. In such implementations, the data collected by the components of the system 100 can initially be relayed to the monitor control unit 110, which then transmits the corresponding data to the application server 160.

Figure 2:
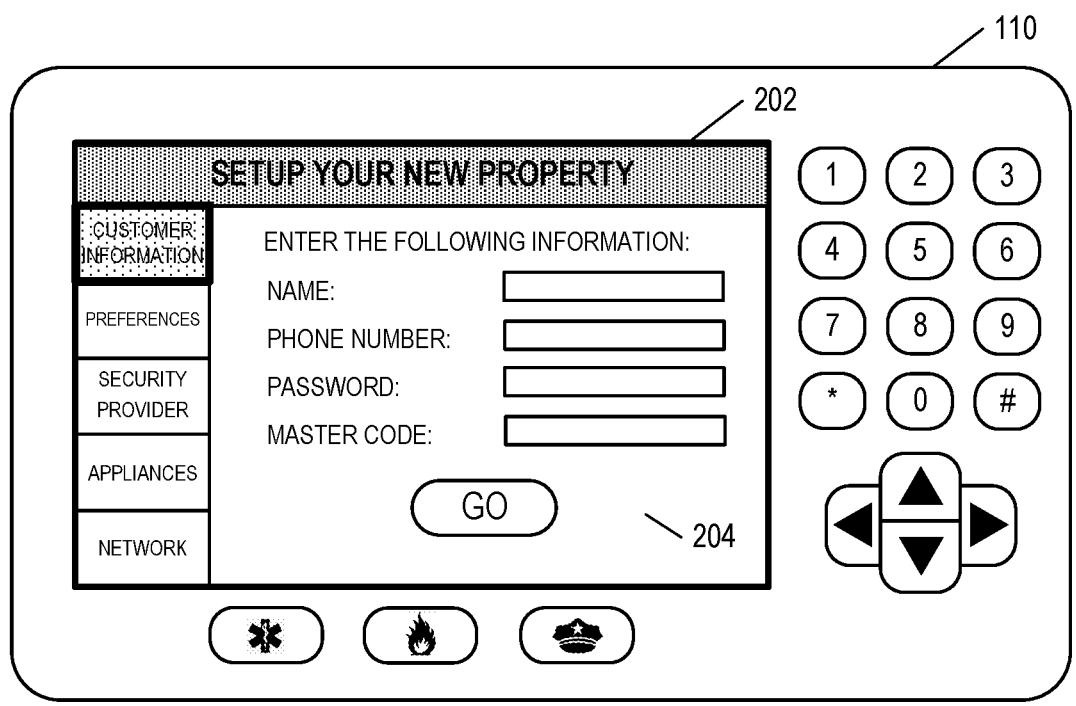
FIG. 2 is a diagram that illustrates an example of a control unit that provides move-in information to a new customer of a property.

FIG. 2 illustrates a diagram of a control unit that provides move-in information to a new customer of a property. As depicted, a control panel within a property (e.g., the monitor control unit 110) may provide move-in information 204 on an interface 202.

In general, the interface 202 can be used as a customer portal to activate or deactivate the security system of the property, remotely configure and/or control the appliances 130, and specify monitoring operations performed by the sensors 120. For instance, a customer may provide user inputs on the interface 202, and in response to receiving user inputs, the monitor control unit 110 may transmit corresponding instructions to the components of the system 100. In one example, a customer may use the interface 202 to configure a security code to deactivate a security system and provide access to the property.

During a move-out process, the monitor control 110 unit may initially determine that the property is presently vacant. In response, this determination can be used to reconfigure the user interface 202 to enable a new customer to update settings associated with the property during a subsequent move-in. As depicted in FIG. 2, the interface 202 can provide a Tillable form that allows the new customer to provide customer information. Examples of the customer information may include a name, phone number, password, and a master code for the security system of the property. In some instances, the submitted customer information can then be transmitted to the application server 160 to update any customer accounts that are associated with the property (e.g., disassociating the prior customer's account with the property and associating the new customer's account with the property). If the new customer does not have a customer account stored on the application server 160, a new customer account may be created using the submitted customer information 204 on the interface 202.

In some implementations, the system 100 is operated and maintained by a third party service provider that is a separate entity from the security provider of the property. In such implementations, the interface 202 may provide an option for the new customer to provide subscription information for the customer's security provider on the interface 202. For example, the new customer may be requested to provide the address of his/her prior residence, an account number, a username/password, or other types of user-specific information. In response to obtaining the customer's security provider information, the monitor control unit 110 then relays the information to the application server 160 to associate the property with the customer's security provider account on the application server 160. In this regard, the interface 202 can be used to both reduce the likelihood that the system 100 is configured with outdated security provider information (e.g., information associated with the prior customer), and improve the likelihood that the property is properly reconfigured assist the new customer in retaining existing security services.

In some instances, submitted security provider information on the interface 202 may be used to notify a security provider that an existing subscriber has moved to a new location. For instance, after the new customer has provided security provider information on the interface 202, the monitor control unit 110 may then transmit a notification to the associated security provider that the new customer has moved into the property. In response, the monitor control unit 110 may receive a notification that the property requires a hardware installation by the security provider, or a service appointment to ensure that the components of the security system are properly operating in accordance to the provider's guidelines. The notification can then be displayed to the new customer on the interface 202, or on the client devices 140, 150.

In some implementations, if the system 100 is unable to identify a security provider associated with the submitted security provider information submitted on the interface 202, or if the new customer does not presently have a subscription for security services, the interface 202 may instead provide a list of recommended security providers for the property. The security provided included in the list may be based on, for example, the location of the property, the market value of the property, security service subscriptions for prior owners/tenants of the property, indications of the new customer's preferences provided on the interface 202, or other types of suitable information. In this regard, the interface 202 may be used to provide a new customer with options to purchase security services, which may reduce the likelihood that the property will not be protected after a recent move-in procedure.

FIG. 3 illustrates an example of a process 300 for performing moving operations for a vacant property. Briefly, the process 300 may include receiving data indicating a customer move-out associated with a property (310), monitoring data generating by one or more sensors located at the property (320), automatically determining that the property is presently vacant based on the monitored data (330), and in response, performing one or more moving operations associated with the property (340).

In more detail, the process 300 may include receiving data indicating a customer move-out associated with a property (310). For instance, the monitor control unit 110 may receive data including customer information indicating an upcoming customer move-out (e.g., an electronic request to transfer Internet or phone services). In other instances, the received data may be a request to terminate security services submitted by the user on the interface 202, or indications from a security provider that includes a move-out data previously provided by the user.

In some implementations, after receiving the data indicating a customer move-out, the monitor control unit 110 may request the customer to verify the move-out on the interface 202. For example, the interface 202 may request the customer to provide a confirmation of an upcoming move-out and a submission for the move-out date.

The process 300 may include monitoring data generating by one or more sensors located at the property (320). For instance, the monitor control unit 110 may obtain data collected by the sensors 120 and the appliances 130 from the property. As described previously with respect to FIG. 1, the collected data can include occupancy data, presence information, user-defined changes to the interior conditions within the property, or other types of activity data associated with the property.

The process 300 may include automatically determining that the property is presently vacant based on the monitored data (330). For instance, occupancy data collected by the sensors 120 can be used to monitor movement and activity within the property and make a determination that the property is presently vacant. Examples that can be used to indicate vacancy may include the lack of customer input on the appliances 130 over a threshold period of time, lack of adjustments to the internal set point temperature within the property and/or the lack of any detected activities within or near the premises of the property indicating that an occupant has not been present within the property for an extended period of time.

The process 300 may include performing one or more moving operations associated with the property in response to determining that the property is presently vacant (340). For instance, as described previously with respect to FIG. 1, moving operations can include adjusting the monitoring operations of the vacant property to reduce susceptibility to various risks associated with a property such as susceptibility to fires and/or other natural hazards, or security breaches. In such instances, after determining that the property is presently vacant, the monitor control unit 110 automatically transmits instructions to the sensors 120 and the appliances 130 to adjust their operations to prioritize monitoring activities directed to reducing susceptibility to risks associated with the property.

In other instances, moving operations can include providing move-in information to a new customer of the property prior to, or recently after, a move-in process. For instance, after determining that the property is presently vacant, the monitor control unit 110 may clear the stored customer information 170 associated with the prior customer, and reset the operation of the components of the system 100. As an example, the monitor control unit may remove configured security access codes and/or passwords associated with the property that were previously configured by the prior customer. In some instances, the monitor control unit 110 may also implement a temporary security access code to the property to secure the vacant property after a prior customer has moved out, but before a new customer has moved in. In such instances, the temporary security access code may be provided to the new customer prior to his/her move-in date.

FIG. 4A is a diagram illustrating examples of different configurations in relation to an exemplary occupant transition process. During this process, the application server 160 monitors the condition of a property 401 to determine, for instance, when a first user (e.g., "USER A" depicted in the figure) has moved out of the property 401, and when a second user (e.g., "USER B" depicted in the figure) has moved into the property 401. The application server 160 monitors the condition of the property 401 determine whether it is occupied and the user that occupies the property 401. In the example, the application server determines an occupancy condition 404a during a time period when the property 401 is occupied by the first user, an occupancy condition 404b during a time period when the property 401 is temporarily unoccupied (or vacant) after the first user has moved out, and a condition 404c during a time period when the property 401 is occupied by the second user after he/she has moved into the property 401.

The application server 160 may identify a change in occupancy condition of the property 401 (e.g., occupancy condition 404a to occupancy condition 404b, occupancy condition 404b to occupancy condition 404c) based on estimating a move-out date 412 for the first user, and a move-in date 414 for the second user. As described above, the application server 160 may estimate the move-out and move-in dates 412 and 414 based on, for example, sensor data indicating detected activity within the property 401, service information included within the monitoring system accounts of the first and second users, user inputs received from the first and second users, or a combination thereof. Move-out and move-in detection by the application server 160 are described in greater detail below with respect to FIGS. 4B and 4C.

The application server 160 may also generate different configurations for a monitoring system located within the property 401 based on the occupancy condition determined for the property 401. For example, the application server 160 generates configuration data 402a for configuring the monitoring system during a time period when the property 401 is determined to have the occupancy condition 404a, configuration data 402b for configuring the monitoring system during a time period when the property 401 is determined to have the occupancy condition 404b, and configuration data 402c for configuring the monitoring system during a time period when the property 401 is determined to have the occupancy condition 404c.

In the examples depicted in the figure, the configuration data 402a, 402b, and 402c enable the monitoring system of the property 401 to prioritize different monitoring operations that are associated with the corresponding occupancy status of the property 401. For instance, the configuration data 402a enables the monitoring system to perform monitoring operations that increase the likelihood of detecting and/or predicting the move-out date 412. During this time period, the monitoring system may monitor subscription information for the first user to identify an indicated move-out date. The monitoring system may also monitor activity data collected by sensors located within the property 401, scan for user input data indicating an anticipated move-out, or monitor the frequency of adjustments made to monitoring devices of the monitoring system (e.g., adjustments to the set point temperature, adjustments to HVAC settings, etc.).

The configuration data 402b enables the monitoring system to perform monitoring operations that relate to monitoring a vacant property once the first user has moved out of the property 401. During this time period, the monitoring system may verify the vacancy of the property 401 after the move-out date 412 (e.g., to prevent unauthorized access by an intruder). The monitoring system may also prioritize essential monitoring operations that have a can have a more significant impact on the property 401 over routine monitoring operations that are performed according to a user's specified preferences. For example, the monitoring system may stop executing monitoring operation rules that were previously configured by the first user during his/her occupancy at the property 401 and instead prioritize the detection of security breaches, property damage conditions (e.g., fires, electrical failure, water damage, etc.).

During the vacancy period, the monitoring system may also perform various operations related to the occupancy transition between the first user and the second user. For example, in some implementations, the monitoring system may backup the existing configuration of the monitoring system as used by the first user. The configuration backup may either be stored locally on a control unit (e.g., the control unit 110) or remotely on the application server 160. In addition, the monitoring system may also process the existing configuration data to remove any information that identifies the first user that has recently moved out of the property 101. For example, the monitoring system may remove any personally identifiable information (e.g., name, social security number, financial information, etc.), monitoring system rules that were customized by the first user, or any other type of monitoring system configuration that was configured by the first user.

In some implementations, the monitoring system may perform the backup operations described above based on a set of user input provided by either the first user and/or the second user. For example, the monitoring system may remove the prior configuration of the monitoring system as used by the first user in its entirety if the first user indicates that he/she would prefer to remove all information (as opposed to personal information only). In another example, the monitoring system may store a prior configuration of the monitoring system as used the first user as a predetermined configuration template that configures the monitoring system once the second user moves into the property 401. In this example, if the second user indicates that he/she would like to set up a new configuration for the monitoring system, the monitoring system may remove or otherwise delete the stored configuration template.

Figure 6A:
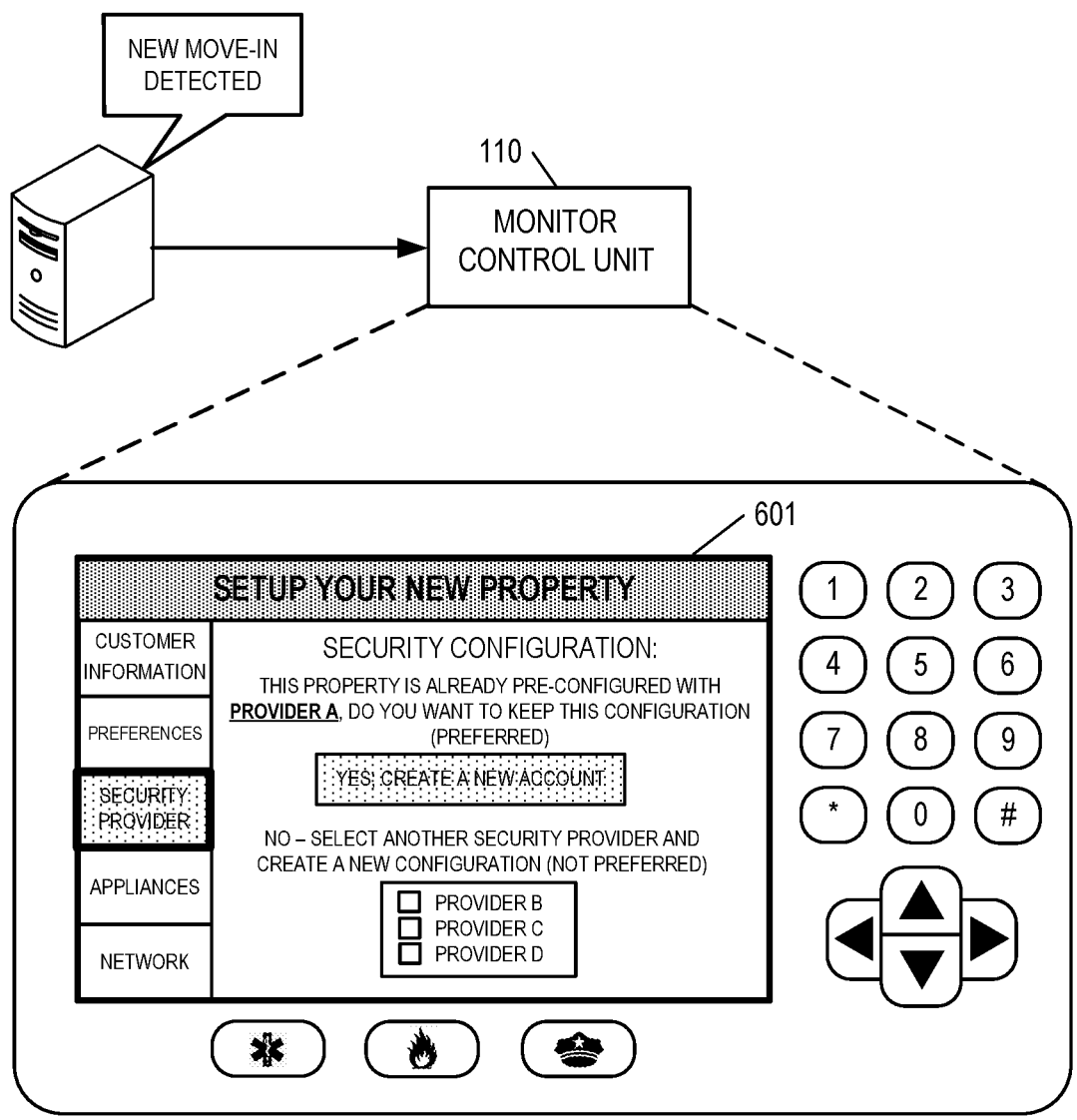
FIGS. 6A-6B are diagrams illustrating examples of interfaces for configuring a monitoring system after a detected move-in at a property
Figure 6B:
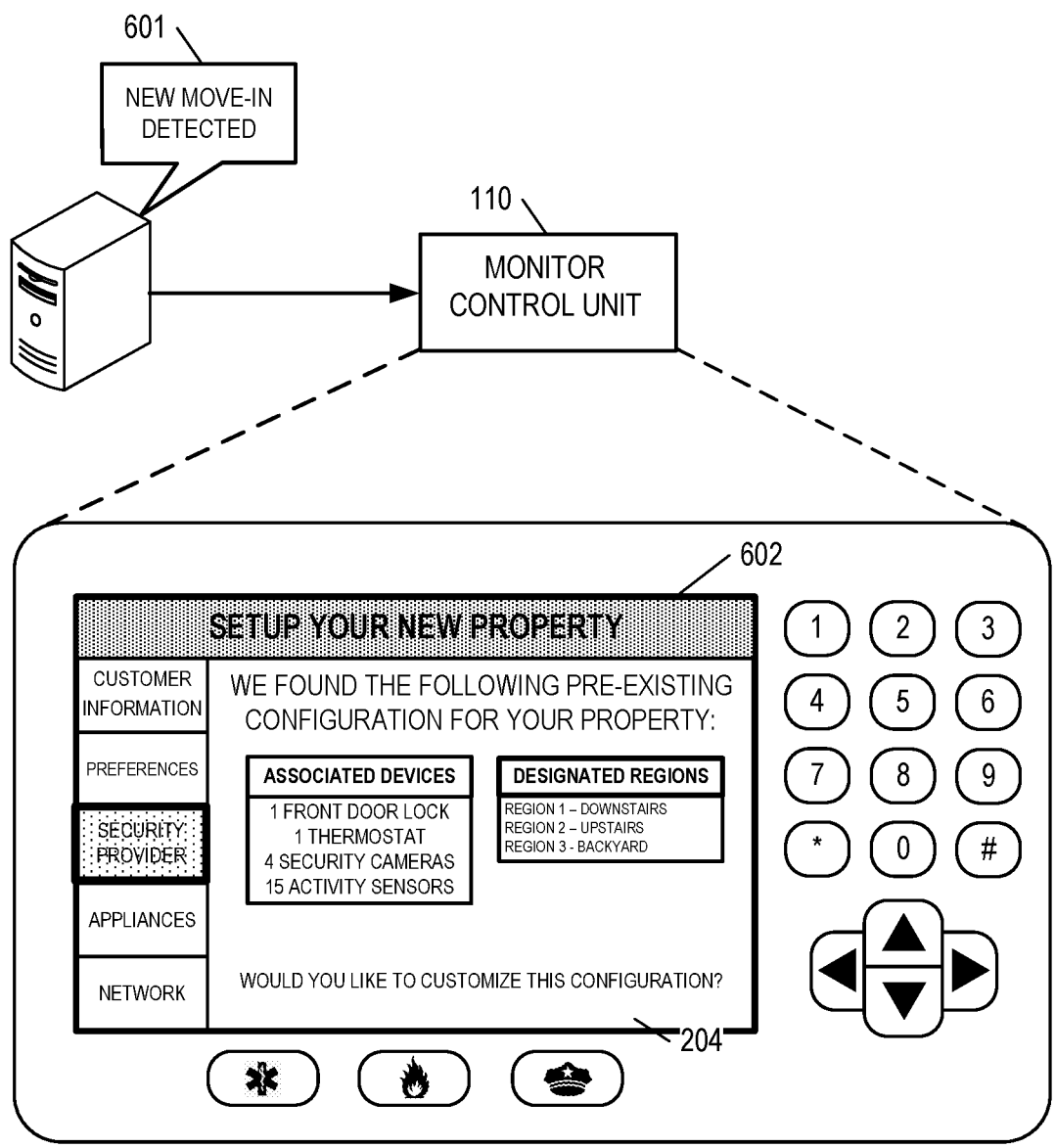

The configuration data 402c enables the monitoring system to adjust its operations in response to a newly detected move-in by the second user. During this time period, the monitoring system may scan for user input data that indicates that the second user has moved into the property (e.g., user input received on a control panel of the monitoring system). In response to receiving user input indicating that the second user has moved into the property 101, the monitoring system may present a configuration interface that enables the second user to configure the monitoring system. For example, as depicted in FIGS. 6A and 6B, the second user may either configure the monitoring system based on a prior configuration of the monitoring system as used by the first user, or customize the monitoring system as a new configuration.

Although the management and adjustment of the monitoring system in depicted to be performed by the application server 160, in some implementations, such operations may additionally, or alternatively, be performed locally by a control unit of the monitoring system that is located within the property 401. In such implementations, the control unit 110 may determine the occupancy conditions 404a, 404b, and 404c, monitor service information for the first user, monitor activity data within the property 401, and/or other local processing operations. The data collected, processed and/or aggregated by the control unit can then be used to generate the configuration data 402a, 402b, and 402c as described above. In some implementations, the control unit 110 may be capable of performing the operations depicted in FIG. 4A substantially independently from the application server 160. In such implementations, the configuration 402a, 402b, and 402c may be determined by the control unit without connectivity to the application server 160.

Figure 4B:
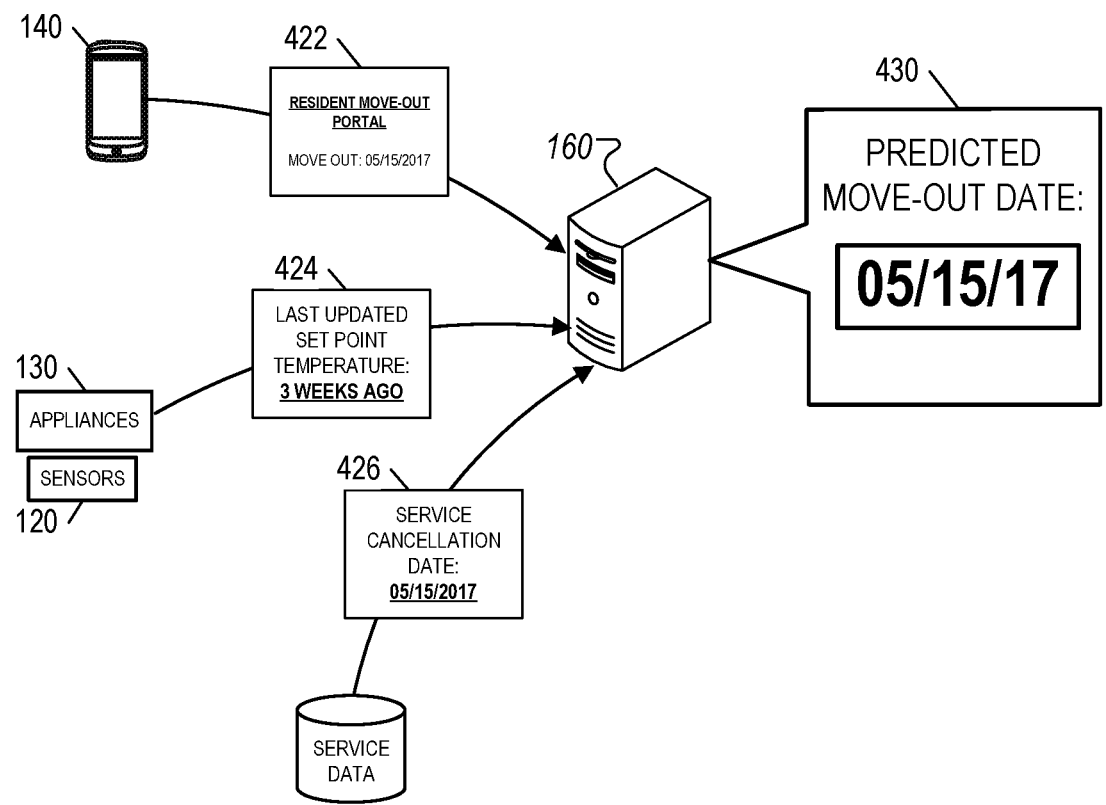
FIG. 4B is a diagram illustrating examples of techniques for predicting a move-out from a property

FIG. 4B is a diagram illustrating examples of techniques for predicting a move-out from a property (e.g., the property 401). The application server 160 generates a prediction 430 of an anticipated move-out data based on data collected from multiple sources. For instance, the application server 160 obtains user input data 422 from the mobile device 140, activity data 424 detected by the sensors 120 and/or the appliances 130 located within the property 401, and service information 426 associated with a user that presently occupies the property 401 (e.g., the "USER A" as depicted in FIG. 4A).

The application server 160 may generate the prediction 430 based on one or more of the information indicated within the obtained data. For example, in some implementations, if one of the data sources provides an unambiguous indication of a move-out date (e.g., a user input indicating a move-out date as shown in the user input data 422), then the application server 160 may predict the move-out date without obtaining data from the other data sources (e.g., data collected by the sensors 120 and the appliances 130, or service information associated with the first user or the property 401). In other implementations, the application server 160 may use the different data sources to verify an initial prediction that is made based on data obtained from a particular data source. For example, the application server 160 may initially generate the prediction 430 based on the user input data 422. In this example, the application server 160 may obtain the user activity data 424 and the service information 426 to verify that the prediction 430 is correct. For instance, the application server 160 may determine that the prediction 430 is inaccurate if, after the predicted move-out date, the activity data 424 indicates that the appliances 130 and/or the sensors 120 have detected periodic and regular activity within the property 401.

In the example depicted in FIG. 4B, the user activity data 422 indicates that the first user has specified a move-out date of "May 15, 2017" in an application and/or webpage that is associated with his/her monitoring service. This user input can then be used to indicate that the first user has planned to move out of the property 401 on or before the indicated move-out date. In addition, the activity data 424 indicates that the set point temperature of a thermostat within the property 401 has not been adjusted in three weeks, indicating a high likelihood that the property 401 has been unoccupied for the last three weeks. Finally, the service information 426 of the monitoring system for the first user indicates a service cancellation date on "May 15, 2017." In each of these examples, the application server 160 obtains different types of information from different sources, which can be collectively processed and/or analyzed to make an accurate prediction of a move-out date for the property 401.

Figure 4C:
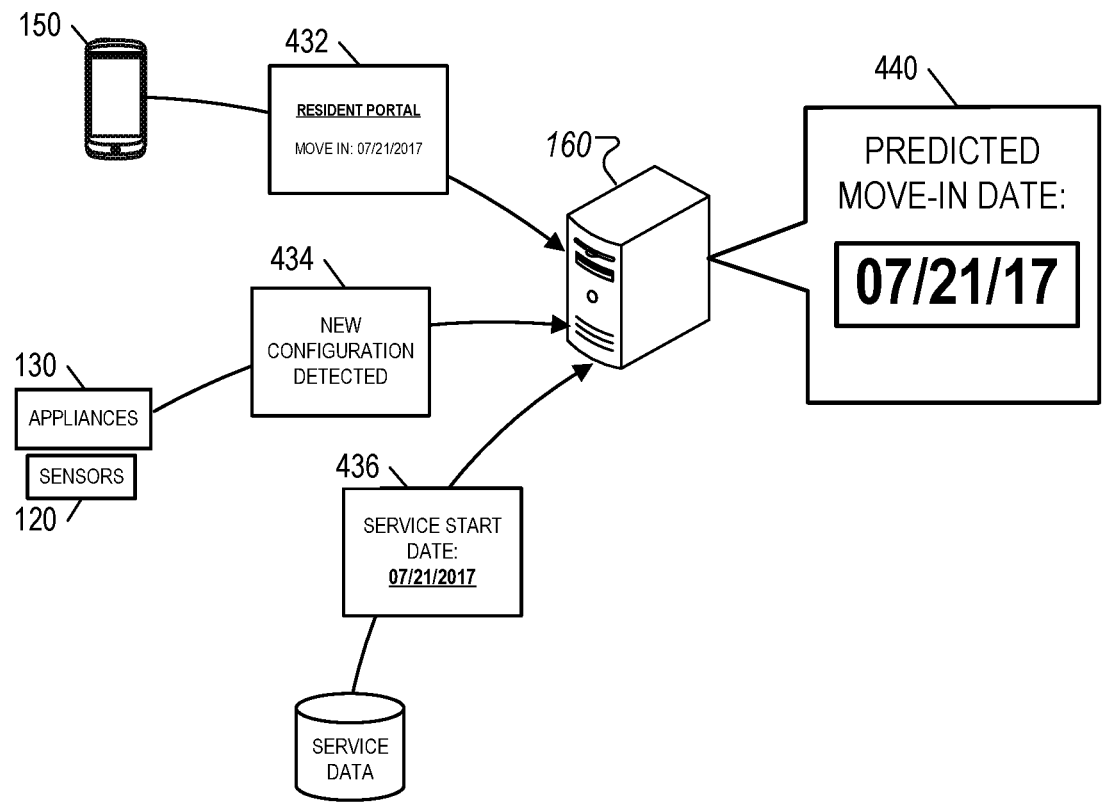
FIG. 4C is a diagram illustrating examples of techniques for predicting a new move-in to a property

In some implementations, the application server 160 may use various pattern recognition techniques to determine if a property has become vacant as a result of a recent move-out. For instance, the application server 160 may compare historical indicators of user activity and/or presence to current or recently obtained activity detected by the monitoring system that is located within the property. As an example, if historical indicators indicates that a user frequently armed the monitoring system of the property during his occupancy period, then a detected low frequency of arming can be used to determine that the user has recently moved out of the property. In other instances, the system may compare present or recent configurations associated with the monitoring system with historical configurations to determine if the user may have vacated the property. For example, if the user's historical set point temperature is a high temperature (e.g., 85 F), but the monitoring system measures a high efficiency set point, then the monitoring system may determine that the user has vacated the property. FIG. 4C is a diagram illustrating examples of techniques for predicting a new move-in to a property (e.g., the property 401). The application server 160 generates a prediction 440 of an anticipated move-in date based on data collected from multiple sources. For instance, the application server 160 obtains user input data 432 from the mobile device 150, activity data 424 detected by the sensors 120 and/or the appliances 130 located within the property 401, and service information 426 associated with a user that has recently moved into, or is expected to move into, the property 401 (e.g., the "USER B" as depicted in FIG. 4A). In this example, the mobile device 150 may be associated with the "USER B" whereas the mobile device 150 may be associated with the "USER A" as depicted in FIG. 4B.

As described above with respect to FIG. 4B, the application server 160 may generate the prediction 440 based on one or more of the information indicated within the obtained data. For example, in some implementations, if one of the data sources provides an unambiguous indication of a move-in date (e.g., a user input indicating a move-in data as shown in the user input data 432), then the application server 160 may predict the move-in date without obtaining data from other data sources (e.g., data collected by the sensors 120 and the appliances 130, or service information associated with the second user or the property 401). In other implementations, the application server 160 may use the different data sources to verify an initial prediction that is made based on data obtained from a particular data source. For example, the application server 160 may initially generate the prediction 440 based on the user input data 432. In this example, the application server 160 may obtain the user activity data 434 and the service information 436 to verify that the prediction 440 is correct.

In the example depicted in FIG. 4C, the user activity data 432 indicates that the second user has specified a move-in date of "Jul. 21, 2017" in the application and/or webpage that the first user used to indicate a move-out date as described above with respect to FIG. 4B. The user input can then be used to indicate that the second user has planned to move out of the property 401 on or after the indicated move-in date. In addition, the activity data 424 indicates that a new configuration has been detected for the appliances 130 and/or the sensors 120, indicating that the second user has either adjusted a pre-existing configuration for the monitoring system or provided a new configuration for the monitoring system. Finally, the service information 436 of the monitoring system indicates a service start date on "Jul. 21, 2017." In this example, the service information 436 can be obtained based on an updated association between a customer identifier and the monitoring system equipment within the property 401, or based on a new configuration for the monitoring system equipment as used by the second user.

FIG. 5 is a diagram illustrating examples of different monitoring operations that can be prioritized when a property is determined to be vacant. As depicted, a repository 510 includes multiple monitoring operations that are performed by monitoring devices of a monitoring system of a property (e.g., the property 410). The repository 510 also includes a prioritization score for each monitoring operation that is performed by the monitoring system. In the example, a value of the prioritization score for a particular monitoring operation represents a respective likelihood that the monitoring system should perform the particular monitoring operation during, for example, a time period when the property 401 is vacant after a recent move-out operation. For instance, a high prioritization score can represent or a high determined likelihood that the monitoring system should perform a corresponding monitoring operation, whereas a low prioritization score can represent a low determined likelihood that the monitoring system should perform a corresponding monitoring operation.

The monitoring system can use the prioritization scores that are assigned to each monitoring operation to, for example, determine certain monitoring operations to perform when the property 401 is determined to be vacant. In the example depicted in FIG. 5, the monitoring system uses a threshold prioritization score of "0.5" to selectively perform only those monitoring operations within the repository 510 that have a prioritization score that satisfies the threshold prioritization score. In this example, the monitoring system only performs fire and smoke detection and intruder and alarm detection in monitoring the condition of the property 401 after a move-out period. In this regard, the monitoring system applies the monitoring threshold to prioritize the execution of monitoring operations that monitor potential vulnerabilities of a vacant property (e.g., fires and security breaches).

In other examples that are not depicted in FIG. 5, the monitoring system may also use the prioritization scores to adjust the frequency with which monitoring operations are performed. In such examples, the value of a prioritization score may be used to indicate a frequency of executing a monitoring operations such that higher-priority monitoring operations are performed frequently (e.g., on an hourly basis), whereas lower-priority monitoring operations are performed less frequently (e.g., on a weekly basis). In some instances, the monitoring system can adjust the values of the prioritization scores based on property attributes (e.g., property type, property size, number of monitoring devices, placement/configuration of monitoring devices, etc.) to determine which monitoring operations are unnecessary to perform when the property is vacant (e.g., monitoring operations that are associated with user preferences) and necessary monitoring operations that ensure that the property condition does not substantially degrade during the vacancy period (e.g., periodic monitoring device maintenance checks).

FIGS. 6A-6B are diagrams illustrating examples of interfaces for configuring a monitoring system after a detected move-in at a property. Referring initially to FIG. 6A, an interface 601 is depicted. The interface 601 allows a user that has recently moved into a property (e.g., the "second user" as described above with respect to FIG. 4A) to configure various aspects of a monitoring system. In some implementations, the interface 601 can be provided through the customer portal described above with respect to FIG. 2. For instance, the interface 601 may be a specific page where the second user configures a monitoring system for the first time after a move-in operation.

In the example depicted in FIG. 6A, the interface 601 enables the second user to configure an existing monitoring system at a property (e.g., the property 401). For example, the monitoring system within the property 401 may be one that has been previously configured by a prior occupant (e.g., the "first user" as described above with respect to FIG. 4A). In this example, the interface 601 provides the second user with an option to configure the monitoring system based on an existing configuration with a service provider of the first user (e.g., "PROVIDER A"). The interface 601 also provides the second user with a second option to configure the monitoring system based on new configuration that is independently configured from the existing configuration. As examples, the second user may wish to newly configure the monitoring system if he/she has added and/or removed monitoring devices, adjusted the placement of monitoring devices, or has a service contract with a different service provider. The interface 601 can also provide a list of recommended service providers (e.g., "PROVIDER B," "PROVIDER C," "PROVIDER D") that are not currently associated with the property 401 but are determined to provide services to other nearby properties.

If the second user chooses to import a prior configuration but does not have an account with the security provider associated with the existing configuration, the interface 601 may enable the second user to create a new account with the security provider to retain similar monitoring services as the first user. In this regard, from the service provider's perspective, the interface 601 improves the occupancy transition process to potentially increase retention of monitoring services provided to a property during an occupancy transition. Alternatively, if the second user chooses to newly configure the monitoring system, the monitoring system may delete an existing configuration for the monitoring system as used by the first user. In this situation, the second user may select another service provider from a list of recommended service providers. In some instances, the interface 601 enables the second user to associate the monitoring system equipment with a service provider that the second user already has an account with.

In the example discussed above, the interface 601 may additionally, or alternatively, provide a user with an option to contact an existing service provider associated with the property where the control unit 110 is located. For instance, the interface 601 can provide an option to the second user to call and speak with a service representative associate with "PROVIDER A" and/or schedule a service appointment after he/she has moved into the property. In other instances, where the second user has opted to select another provider that is not currently associated with the property, the interface 601 may provide contact information for the provider and enable the user to call a service representative and/or schedule a service appointment at the property.

Referring now to FIG. 6B, an interface 602 is depicted. The interface 602 allows a user that has recently moved into a property (e.g., the "second user" as described above with respect to FIG. 4A) to configure a monitoring system based on an existing configuration for the monitoring system as used by a prior user (e.g., the "first user" as described above with respect to FIG. 4B). In some implementations, the interface 602 can be provided through the customer portal described above with respect to FIG. 2. For instance, the interface 602 may be a specific page where the second user views a prior configuration when configuring the monitoring system for a first time after a move-in operation.

In the example depicted in FIG. 6B, the interface 602 enables the second user to import a prior configuration of the monitoring system as used by a first user. For example, the monitoring system may identify monitoring devices that have already been associated with the monitoring system (e.g., the appliances 130, the sensors 120, etc.), property information indicated by a prior configuration, and/or any designated regions associated within the property 401 that are assigned to each of the associated monitoring devices. As depicted in FIG. 6B, the monitoring system determines that previously associated monitoring devices include a front door lock, a thermostat, four security cameras, and fifteen activity sensors that were installed by the first user. In addition, the monitoring system also determines that first user has specified three designated regions within the property including a "DOWNSTAIRS" region, a "UPSTAIRS" region, and a "BACKYARD" region.

The interface 602 may also enable the second user to customize the existing configuration for the monitoring system as used by the first user. For example, the interface 602 may enable the second user to specify device information for additional monitoring devices that he/she has added to the property 401 after moving in, removing one or more of the associated monitoring devices, adjusting the prior configuration for the one or more of the associated monitoring devices, and/or customizing the assignment of the regions to collections of different monitoring devices.

Figure 7:
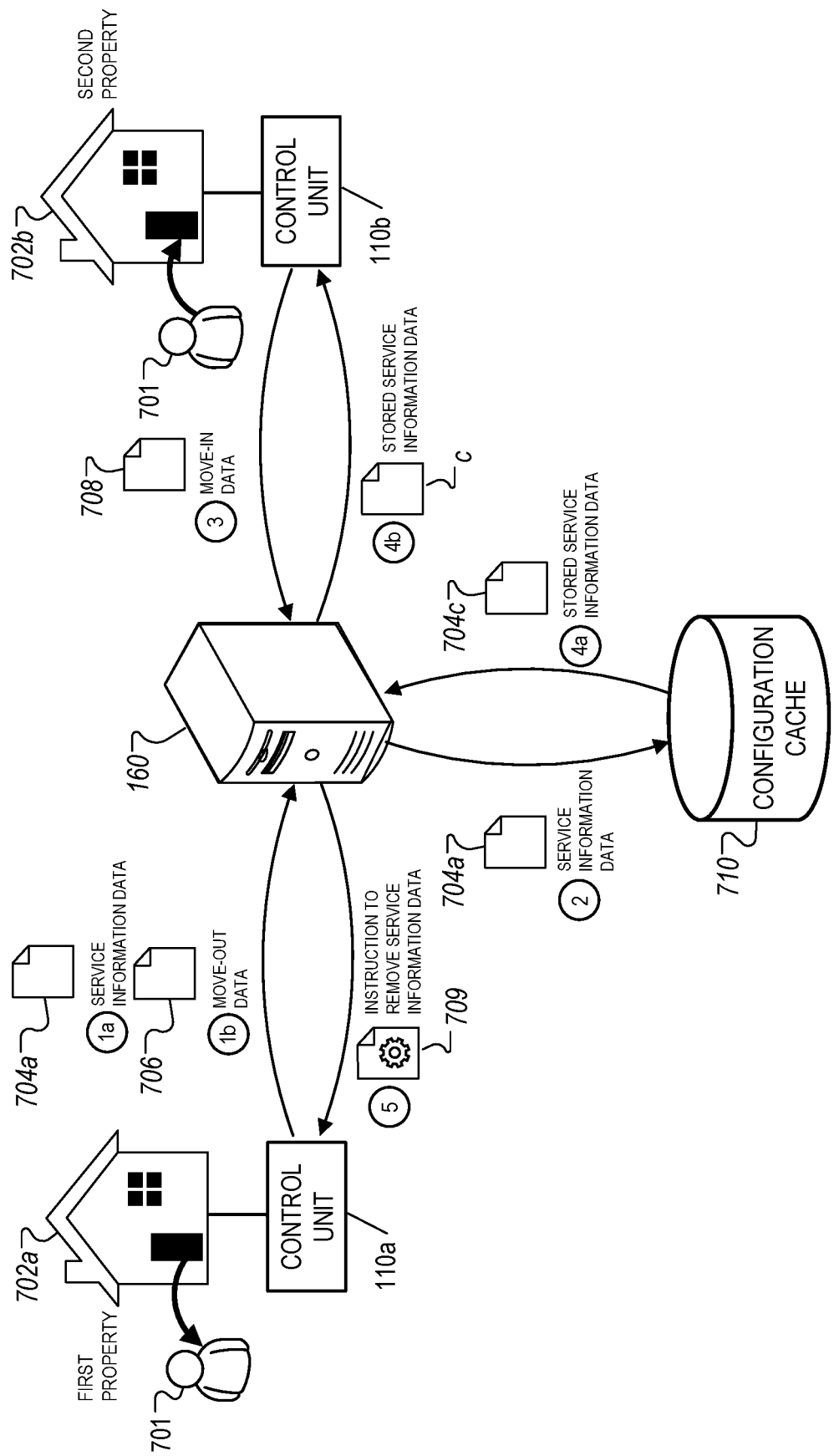
FIG. 7 is a diagram illustrating examples of techniques for configuring different monitoring systems of a user in relation to a moving operation.

FIG. 7 is a diagram illustrating examples of techniques for configuring different monitoring systems of a user in relation to an exemplary property transition process. During this process, the application server 160 obtains, processes, and transmits various types of information and data that is associated with a user 701 who transitions from a first property 702a to a second property 702b.

according to a sequence of events that are identified in the figure as numbers. At stage (1), the application server 160 obtains service information data 704a and move-out data 706, associated with a first user 701 that moves out from a first property 702a, from a control unit 110a located within the first property 702a. At stage (2), the application server 160 temporarily stores service information data 704a in a configuration cache 710. At stage (3), the application server 160 obtains move-in data 708 associated with the first user that moves into a second property 702b. At stage (4), the application server 160 obtains stored service information 704c from the configuration cache 710 and transmits the stored service information 704c to a control unit 110b located in the second property 702b. At stage (5), the application server 160 transmits an instruction 709 to the control unit 110a to remove personal information associated with the user 701 from the monitoring system located within the first property 702a.

In more detail with respect to stage (1), the service information data 704a can include information relating to the monitoring services obtained by the user 701 at the first property 702a. For example, the service information data 704a can identify a subscription service that the user 701 has purchased from a security provider that provides a set of monitoring and security services to the first property 702a. In addition, the move-out data 706, as described above, can include various types of information indicating that the user 701 plans to move out of the first property 702a (e.g., user input data indicating an upcoming move out, data collected by sensors located within the first property 702a, or information within the service information data 704a that indicates an upcoming move out).

At stage (2), the application server 160 temporarily stores service information data 704a in a configuration cache 710. The configuration cache 710 can be a database and/or repository associated with the application server 160 that is used to temporarily store, for example, account information for the user 701 during a transition from the first property 702a to the second property 702b. For example, the configuration cache 710 can store the service information data 704a as a backup configuration of the monitoring system of the first property 702a. In this example, the storage of the service information data 704a within the configuration cache 710 enables the application server 160 to migrate the existing configuration to, for instance, a cloud-based storage medium, which can then be accessed and transmitted to a monitoring system of the second property 702b as described below.

At stage (3), the application server 160 obtains move-in data 708 associated with the first user that moves into a second property 702b. For instance, once the user 701 has moved into the second property 702b, the application server 160 may use the techniques described above to detect a recent move-in at the property 702b. In some examples, the user 701 may use an application that runs on an associated mobile device (e.g., the mobile device 140) to provide an indication that he/she has started to, or completed, moving into the property 702b. In response, the application server 160 obtains the move-in data 708, which enables the application server 160 to identify new monitoring system equipment of the user 701 within the second property 702b. For instance, the move-in data 708 may include network and hardware configuration information for the control unit 110b that enable the application server 160 to exchange communications with the control unit 110b after the move in operation.

At stage (4), the application server 160 obtains stored service information 704c from the configuration cache 710 and transmits the stored service information 704c to a control unit 110b located in the second property 702b. The control unit 110b then uses the stored service information data 704c to configure the monitoring system located within the second property 702b according to a configuration of the monitoring system of the first property 702a. For example, the control unit 110b can import, from the stored service information data 704c, monitoring rules that the user 701 previously configured for the monitoring system of the first property 702a, user preferences for performing monitoring operations, among other types of configuration information.

On the server side, once the application server 160 has transmitted the stored service information data 704c to the control unit 110b, the application server 160 may update the customer account for the user 701 to adjusts its associated with the control unit 110a and the monitoring system of the first property 702a to a new associated with the control unit 110b and the monitoring system of the second property 702b. In this regard, the application server 160 automatically removes an association of the customer account and the first property 702a and generates a new association between the customer account and the second property 702b. The application server 160 can perform this adjustment to, for example, improve customer retention during a property transition process, reduce interruptions of serviced provided at the second property 702b due to outdated data associations and/or references to the monitoring equipment of the first property 702a, among others.

At stage (5), the application server 160 transmits an instruction 709 to the control unit 110a to remove personal information associated with the user 701 from the monitoring system located within the first property 702a. For instance, as described above, the application server 160 may process the contents of the stored service information data 704b to identify, for example, personally identifiable information of the user 701 (e.g., social security number, credit card information, etc.), user preferences of the user 701, among other types of user-specific information. The transmitted instruction 709 identifies the personal information, which then causes the control unit 110a to remove all personal information associated with the user 701 from the existing configuration of the monitoring system located within the property 702a. Once the control unit 110a has executed the instruction 709, the personal information for the user 701 will be removed such that a subsequent owner of the property 702a will not be able to obtain the personal information. Examples of personal information can include any media that has been captured by video and/or image sensing devices (e.g., security video footage collected and stored on the control unit 110), images of the property, or registration information associated with the prior occupants of the property.

The instruction 709 can be transmitted at various time points associated with a move-out or a move-in operation at the property 702a. For instance, in some implementations, the instruction 709 is transmitted once a move-out has been detected and the property 702a is determined to be vacant based on the techniques described above. In other implementations, the system may delay the transmission of the instruction 709 until a new move-in has been detected at the property 702a. In such implementations, the system enables the user 701 to temporarily access the property 702a even after he/she has moved out of the property 702a.

In the examples described above, the application server 160 is capable of configuring of the monitoring system located within the first property 702a as well as configuring the monitoring system located within the second property 702b. In the first example, the application server 160 adjusts an existing configuration of the monitoring system as used by the user 701 so that a second user can use the monitoring system without accessing personal information of the user 701 after he/she has moved out of the first property 702a. In this example, the first user's prior configuration of the monitoring system can be used to safely enable the second user to configure the monitoring system after he/she moves into the first property 702a. Additionally, in the second example, the application server 160 updates the account information for the user 701 to adjust a prior association with a monitoring system of the first property 702a that he/she has moved out of, to a new associated with a monitoring system of the second property 702b that he/she has recently moved into. In this example, the application server 160 is able to reduce service interruptions and/or service retention during the user's transition process from the first property 702a to the second property 702b.

FIG. 8 is a flowchart illustrating an example of a process for adjusting a configuration of a monitoring system in relation to a moving operation. The process 800 can include establishing an account for a monitoring service of a first user that occupies a first property monitoring by a first monitoring system (810), monitoring for changes in sensor data or status of monitoring service information of the first user (820), detecting at least one change in the sensor data or the status of the monitoring service information of the first user (830), determining that the first user has moved out of the first property (840), performing an operation related to configuration of the first monitoring system (850), using the first configuration information for the first monitoring system to configure the first monitoring system for a second user that has moved into the first property (860A), and using the first configuration information for the first monitoring system to configure a second monitoring system for the first user that has moved into a second property (860B).

In more detail, the process 800 can include establishing an account for a monitoring service of a first user that occupies a first property monitoring by a first monitoring system (810). For instance, the application server 160 may establish an account for a monitoring service of the user 701 that occupies the first property 702a. The property 702a may be monitored by a first monitoring system that includes one or more monitoring devices located within the first property 702a. The account can include configuration information for the first monitoring system as used by the user 701. For example, the configuration information for the first monitoring system can include the service information data 704a as described above with respect to FIG. 7.

The process 800 can include monitoring for changes in sensor data or status of monitoring service information of the first user (820). For instance, the application server 160 may monitor for changes in either sensor data collected by the one or more monitoring devices located within the first property 702a or status of monitoring service information of the user 701 at the first property 702a.

The process 800 can include detecting at least one change in the sensor data or the status of the monitoring service information of the first user (830). For instance, as depicted in FIG. 4B, the application server 160 may detect a change in the sensor data collected by the one or more monitoring devices can be represented in the activity data 424 obtained from the sensors 120 and/or the appliances 130. In another example, the application server 160 may detect a change in the status of monitoring service information can be represented in the service information 426. In each of these examples, changes monitored by the application server 160 can be used to determine that the user 701 has moved out of the first property 702a.

The process 800 can include determining that the first user has moved out of the first property (840). For instance, the application server 160 may determine that the user 701 has moved out of the first property 702a such that the user 701 no longer occupies the first property 702a. This determination can be based on the detection of at least one change in the sensor data collected by the one or more monitoring devices located within the first property 702a, or the status of the monitoring service information of the user 701 at the first property 702a as described above in step 820.

The process 800 can include performing an operation related to configuration of the first monitoring system (850). For instance, the application server 160 may perform an operation related to the configuration of the monitoring system at the first property 702a based on the determination that the user 701 has moved out of the first property 702a. In some implementations, the operation can include configuring the one or more monitoring devices to monitor a condition of the first property 702a until another user has been determined to move into the first property 702a. For example, as depicted in FIG. 4A, the application server 160 may adjust a current configuration of the monitoring system to prioritize the execution of certain monitoring operations that monitor overall property condition and deprioritize the execution of other monitoring operations that are associated with user preferences.

In some implementations, the operation can include storing the configuration information for the monitoring system of the first property 702a as used by the user 701. As described above with respect to FIG. 7, the stored configuration information can be used to provide an existing baseline configuration to another user that moves into the first property 702a, provide the user 701 with temporary access to the first property 702a after he/she has moved out, or generate a new configuration for a monitoring system for the second property 702b that the user 701 eventually moves into after moving out of the first property 702a.

The process 800 can include using the first configuration information for the first monitoring system to configure the first monitoring system for a second user that has moved into the first property (860A). For instance, the application server 160 may use the configuration information for the monitoring system of the first property 702a as used by the user 701 to configure the monitoring system for a second user that moves into the first property 702a after the user 701 has moved out. For example, as depicted in FIGS. 6A and 6B, the application server 160 may enable a control unit of the monitoring system to provide interfaces 601 and 602, which enable the second user to either import an existing configuration for the monitoring system, or create a new configuration for the monitoring system. In this example, the application server 160 uses the prior configuration of the monitoring system as used by the user 701 before he/she moves out to streamline the configuration of the monitoring system for the second user once he/she moves into the first property 702a.

The process 800 can include using the first configuration information for the first monitoring system to configure a second monitoring system for the first user that has moved into a second property (860B). For instance, the application server 160 may use the configuration information for the monitoring system of the first property 702a as used by the user 701 to configure a monitoring system of the second property 702b once the user 701 moves into the second property 702b. For example, as depicted in FIG. 7, the application server 160 may store the service information data 704a for the monitoring system of the first property 702a within the temporary cache 710 after the user 701 has moved out of the first property 702a. Once the user 701 has moved into the second property 702b, the application server 160 can use the stored service information data 704c to configure a new monitoring system that is installed in the second property 702b. In this example, the application server 160 uses the prior configuration of the monitoring system at the first property 702a to improve data migration of the user's monitoring services as his/her occupancy transitions from the first property 702a to the second property 702b.

In some implementations, the application server 160 can also adjust the dispatch instructions for a central monitoring station that is associated with the monitoring system of the first property 702a so that a customer account associated with the first user is adjusted to redirect transmissions from the first property 702a to the second property 702b. In such implementations, the application server 160 can also transmit property information enabling the central application server to adjust monitoring operations once the first user has moved into the second property 702b. In other implementations, the application server 160 can also adjust an emergency contact list (e.g., order of priority, individuals that are included on the list, etc.) that is associated with the monitoring system of the first property 702a so that emergency contacts associated with the first user are not contacted if an emergency condition is detected at the first property 702a after the first user has moved out.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, some implementations are within the scope of the disclosure.

What is claimed is:

1. A method performed by one or more computing devices, the method comprising:
  before a first user has moved out of and vacated a first property:
    determining, for an account a) for a monitoring service of the first user that occupies the first property monitored by a first monitoring system that includes one or more monitoring devices located within the first property b) that includes first configuration information for the first monitoring system as used by the first user, that the first user is scheduled to move out of and vacate the first property at a particular time in the future;
    in response to determining that the first user is scheduled to move out of and vacate the first property at the particular time in the future, instructing the one or more monitoring devices located within the first property to increase monitoring activities i) that were already being performed and ii) that generate human movement data that indicate whether the first user has moved out of and vacated the first property; and
  in response to instructing the one or more monitoring devices located within the first property to increase monitoring activity, receiving, from the one or more monitoring devices, human movement data;
  determining, using the human movement data generated by the one or more monitoring devices located within the first property, that the first user moved out of and vacated the first property; and
  in response to determining, using the human movement data generated by the one or more monitoring devices located within the first property, that the first user moved out of and vacated the first property, performing an operation related to configuration of the first monitoring system at the first property comprising removing the first configuration information for the first monitoring system as used by the first user.

2. The method of claim 1, further comprising:
  using the first configuration information for the first monitoring system as used by the first user to perform a second operation associated with the first monitoring system for a second user that has moved into the first property.

3. The method of claim 2, wherein using the first configuration information for the first monitoring system as used by the first user to perform the second operation comprises configuring the first monitoring system for the second user that has moved into the first property.

4. The method of claim 2, wherein using the first configuration information for the first monitoring system as used by the first user to perform the second operation comprises transmitting a notification to a central monitoring station associated with the first monitoring system of the first property, the notification indicating that the second user has moved into the first property.

5. The method of claim 1, further comprising:
  using the first configuration information for the first monitoring system as used by the first user to perform a second operation associated with a second monitoring system for the first user, the second monitoring system being located at a second property to which the first user has moved.

6. The method of claim 5, wherein using the first configuration information for the first monitoring system as used by the first user to perform the second operation comprises configuring the second monitoring system for the first user.

7. The method of claim 5, wherein using the first configuration information for the first monitoring system as used by the first user to perform the second operation comprises transmitting a notification to a central monitoring station associated with the first monitoring system of the first property, the notification indicating that the first user has moved into the second property.

8. The method of claim 1, wherein performing the operation related to configuration of the first monitoring system at the first property comprises configuring the one or more monitoring devices to monitor a condition of the first property until a second user has been determined to move into the first property.

9. The method of claim 1, wherein performing the operation related to configuration of the first monitoring system at the first property comprises:
  in response to determining, using the human movement data generated by the one or more monitoring devices located within the first property, that the first user moved out of and vacated the first property:
- removing at least some of the first configuration information from the first monitoring system; and
- storing at least some of the first configuration information for the first monitoring system as used by the first user to provide the first user with temporary access to the first property after the first user has moved out of the first property.

10. The method of claim 1, wherein performing the operation related to the configuration of the first monitoring system at the first property comprises removing, from the first configuration information for the first monitoring system, personally identifiable information that identifies the first user to generate a configuration template of the first monitoring system for a second user.

11. The method of claim 1, wherein determining that the first user is scheduled to move out of and vacate the first property at the particular time in the future comprises:
- determining from a multiple listing service that the first property is for sale or has been sold.

12. The method of claim 1, comprising:
- in response to determining that the first user is scheduled to move out of and vacate the first property at the particular time in the future, detecting data that indicates a lack of customer input on kitchen appliances over a threshold period of time; and
- determining that the first user has moved out of and vacated the first property using both the data that indicates the lack of customer input on kitchen appliances over the threshold period of time and the human movement data.

13. The method of claim 1, comprising:
- in response to determining that the first user is scheduled to move out of and vacate the first property at the particular time in the future, detecting data that indicates a lack of adjustments to an internal set point temperature within the first property; and
- determining that the first user has moved out of and vacated the first property using both the data that indicates the lack of adjustments to the internal set point temperature within the first property and the human movement data.

14. The method of claim 1, comprising:
- in response to determining that the first user is scheduled to move out of and vacate the first property at the particular time in the future, detecting both first data that indicates lack of adjustments to an internal set point temperature within the first property and second data that indicates a lack of customer input on kitchen appliances over a threshold period of time; and
- determining that the first user has moved out of and vacated the first property using (i) the first data that indicates the lack of adjustments to the internal set point temperature within the first property, (ii) the second data that indicates the lack of customer input on kitchen appliances over the threshold period of time, and (iii) the human movement data.

15. The method of claim 1, comprising:
- determining whether the first user has moved out of and vacated the first property by comparing historical indicators of user activity to current activity detected by the one or more monitoring devices located within the first property; and
- in response to determining the first user has not moved out of and vacated the first property, skipping an operation related to configuration of the first monitoring system at the first property.

16. The method of claim 1, wherein determining, using the human movement data generated by the one or more monitoring devices located within the first property, that the first user moved out of and vacated the first property comprises:
- determining that the human movement data is not associated with the first user using pattern recognition and certain types of movement detected by the one or more monitoring devices located within the first property that are associated with the first user.

17. A system comprising:
- one or more computers; and
- one or more storage devices storing instructions that, when executed by the one or more computers, cause the one or more computers to perform operations comprising:
  - before a first user has moved out of and vacated a first property:
    - determining, for an account a) for a monitoring service of the first user that occupies the first property monitored by a first monitoring system that includes one or more monitoring devices located within the first property b) that includes first configuration information for the first monitoring system as used by the first user, that the first user is scheduled to move out of and vacate the first property at a particular time in the future;
    - in response to determining that the first user is scheduled to move out of and vacate the first property at the particular time in the future, instructing the one or more monitoring devices located within the first property to increase monitoring activities that were already being performed and that generate human movement data that indicate whether the first user has moved out of and vacated the first property; and
  - in response to instructing the one or more monitoring devices located within the first property to increase monitoring activity, receiving, from the one or more monitoring devices, human movement data;
  - determining, using the human movement data generated by the one or more monitoring devices located within the first property, that the first user moved out of and vacated the first property; and
  - in response to determining, using from the human movement data generated by the one or more monitoring devices located within the first property, that the first user moved out of and vacated the first property, performing an operation related to configuration of the first monitoring system at the first property comprising removing the first configuration information for the first monitoring system as used by the first user.

18. The system of claim 17, wherein performing the operation related to configuration of the first monitoring system at the first property comprises configuring the one or more monitoring devices to monitor a condition of the first property until a second user has been determined to move into the first property.

19. A non-transitory computer storage medium encoded with a computer program, the computer program comprising instructions that when executed by one or more computers cause the one or more computers to perform operations comprising:

before a first user has moved out of and vacated a first property:
   determining, for an account a) for a monitoring service of the first user that occupies the first property monitored by a first monitoring system that includes one or more monitoring devices located within the first property b) that includes first configuration information for the first monitoring system as used by the first user, that the first user is scheduled to move out of and vacate the first property at a particular time in the future;
   in response to determining that the first user is scheduled to move out of and vacate the first property at the particular time in the future, instructing the one or more monitoring devices located within the first property to increase monitoring activities that were already being performed and that generate human movement data that indicate whether the first user has moved out of and vacated the first property; and
   in response to instructing the one or more monitoring devices located within the first property to increase monitoring activity, receiving, from the one or more monitoring devices, human movement data;
   determining, using the human movement data generated by the one or more monitoring devices located within the first property, that the first user moved out of and vacated the first property; and
   in response to determining, using the human movement data generated by the one or more monitoring devices located within the first property, that the first user moved out of and vacated the first property, performing an operation related to configuration of the first monitoring system at the first property comprising removing, from the first configuration information for the first monitoring system, personally identifiable information that identifies the first user to generate a configuration template of the first monitoring system for a second user.

20. The non-transitory computer storage medium of claim 19, the operations comprising:
   determining whether the first user has moved out of and vacated the first property by comparing historical indicators of user activity to current activity detected by the one or more monitoring devices located within the first property; and
   in response to determining the first user has not moved out of and vacated the first property, skipping an operation related to configuration of the first monitoring system at the first property.

* * * * *

UNITED STATES PATENT AND TRADEMARK OFFICE
CERTIFICATE OF CORRECTION

| | |
|---|---|
| PATENT NO. | : 11,553,320 B1 |
| APPLICATION NO. | : 15/478490 |
| DATED | : January 10, 2023 |
| INVENTOR(S) | : David James Hutz and Thomas Rogers |

It is certified that error appears in the above-identified patent and that said Letters Patent is hereby corrected as shown below:

In the Claims

In Claim 17, Column 24, Line 49, after "using" delete "from".

Signed and Sealed this
Eleventh Day of April, 2023

*Katherine Kelly Vidal*

Katherine Kelly Vidal
*Director of the United States Patent and Trademark Office*